United States Patent [19]

Dorn et al.

[11] Patent Number: 4,620,862
[45] Date of Patent: Nov. 4, 1986

[54] PROCESS OF FABRICATING AN ELONGATED GLASS BODY PARTICULARLY A PREFORM FOR OPTICAL WAVEGUIDES

[75] Inventors: Raimund Dorn, Schwieberdingen; Armin Baumgartner, Ludwigsburg, both of Fed. Rep. of Germany

[73] Assignee: International Standard Electric Corporation, New York, N.Y.

[21] Appl. No.: 703,793

[22] Filed: Feb. 21, 1985

[30] Foreign Application Priority Data

Feb. 23, 1984 [DE] Fed. Rep. of Germany ....... 3406475

[51] Int. Cl.$^4$ ............................................. C03B 19/06
[52] U.S. Cl. ..................... 65/18.1; 264/120; 264/332
[58] Field of Search ..................... 65/18.1, 2; 264/120, 264/119, 314, 315, 56, 332, 125, 2.2

[56] References Cited

U.S. PATENT DOCUMENTS

| Re. 20,460 | 8/1937 | Jeffery | 264/314 X |
| 2,888,715 | 6/1959 | Frank | 264/120 X |
| 3,092,878 | 6/1963 | Conger | 264/120 X |
| 3,956,452 | 5/1976 | Saito | 264/314 X |
| 4,097,977 | 7/1978 | Pollner | 264/314 |
| 4,285,896 | 8/1981 | Miller | 264/314 X |
| 4,401,615 | 8/1983 | Gerhardson | 264/120 X |
| 4,473,526 | 9/1984 | Buhler | 264/120 X |
| 4,501,601 | 2/1985 | Haupt . | |

FOREIGN PATENT DOCUMENTS

| 1165814 | 3/1964 | Fed. Rep. of Germany | 65/18.1 |
| 3240355 | 11/1983 | Fed. Rep. of Germany . | |
| 54-09947 | 1/1979 | Japan | 65/18.1 |
| 58-02231 | 1/1983 | Japan | 65/18.1 |

Primary Examiner—Kenneth M. Schor
Attorney, Agent, or Firm—John T. O'Halloran; Robert P. Seitter

[57] ABSTRACT

In order to facilitate a shape-keeping compression in a process of fabricating an elongated glass-body, particularly a preform for optical waveguides on the basis of $SiO_2$ in which, from a powdery glass starting material a porous body is formed and sintered into a glass body, there is provided a process in which the filling of the powdery glass starting material into the compression mold is carried out by simultaneously effecting a pre-compaction and in which, following the fill-in operation, the pre-compacted powdery material is compressed to obtain the porous body. Steps and measures are proposed for stabilizing the flexible hose which is preferably used as a compression mold, in its shape during the fill-in process. For the filling-in of the material there is used a screw conveyor or an arrangement of several screw conveyors arranged coaxially or next to each other, in order to form a porous body having the desired radial material composition. Differently designed compression molds for fabricating tubular or rod-shaped porous bodies are described.

18 Claims, 4 Drawing Figures

PROCESS OF FABRICATING AN ELONGATED GLASS BODY PARTICULARLY A PREFORM FOR OPTICAL WAVEGUIDES

BACKGROUND OF THE INVENTION

The invention relates to a process of fabricating an elongated glass body, particularly a preform for optical waveguides on the basis of $SiO_2$, in which from powdery glass starting material a porous body is formed which is sintered to obtain the glass body.

One such process is known from U.S. Pat. No. 4,501,601. The forming of the porous body from the powdery glass starting material is carried out in this process by causing the powdery glass starting material to loosely run into a compression mold, with the loosely filled-in material then being compressed into the desired shape of the porous body This kind of fill-in procedure, which may also be referred to as a fill, results in only a relatively low density at the conclusion of the filling operation, especially in the case of powders of very fine distribution, so that a shape-keeping compression is rendered difficult. Moreover, the compression mold is only inhomogeneously filled in the course of this filling operation, because cavities are likely to result owing to bridge formations in the powder.

A similar process is known from the German Pat. No. DE-PS 32 40 355, in which the glass starting material in the form of granules is loosely piled up to form a bulk body, with this bulk body being stabilized in shape on its circumference during its pile up and then, by way of compression, being formed into a porous body. This process also has the disadvantage that only a slight density and cavities are likely to result in the bulk body from the piling up, by which a shape-keeping compression is rendered difficult.

SUMMARY OF THE INVENTION

Accordingly, it is a general object of the present invention to avoid the disadvantages of the prior art.

More particularly, it is one of the objects of the invention to provide a process of producing glass bodies from pulverulent material formed into porous bodies and then sintered, which avoids the disadvantages of the conventional processes of this type.

It is yet another object of the present invention to develop a process of this type which would render it possible to fabricate the glass bodies from such porous bodies with a high degree of reliability and dependability.

A concomitant object of the present invention is to provide an apparatus for performing the above method, which is simple in construction, inexpensive to manufacture, easy to use, and reliable in operation nevertheless.

In pursuance of these objects and others which will become apparent hereafter, one feature of the present invention resides in a process of fabricating elongated glass bodies, particularly preforms for optical waveguides, from pulverulent starting materials, especially such including $SiO_2$, which process comprises the steps of filling at least one pulverulent starting material into a confining zone in such a manner as to be pre-compacted during the filling step and to form a pre-compacted body in the confining zone; compressing the pre-compacted body subsequently to the filling step to convert the pre-compacted body into a porous body; and sintering the compacted porous body into the glass body.

BRIEF DESCRIPTION OF THE DRAWING

Above-mentioned and other features and objects of this invention will become more apparent by reference to the following description taken in conjunction with the accompanying drawing, in which:

FIG. 3b is a longitudinal sectional view of a compression mold fitting the conveying device shown in FIG. 3a.

DETAILED DESCRIPTION OF THE PREFERRED EMBODIMENT

In the following, the invention will now be described as it is to be used for fabricating a preform for optical waveguides, with the starting material containing $SiO_2$ as its base material, which, for the purpose of changing the refractive index, contains, as a rule, one or more doping agents such as $GeO_2$, $P_2O_5$, F, or $B_2O_3$. It should be pointed out, however, that the process according to the invention is also suitable for fabricating articles other than optical waveguides, so long as the starting material which comes in question therefor is capable of being manufactured in powder form and of being compressed into a porous body, and the latter is capable of being sintered into a glass body.

Figure 1:
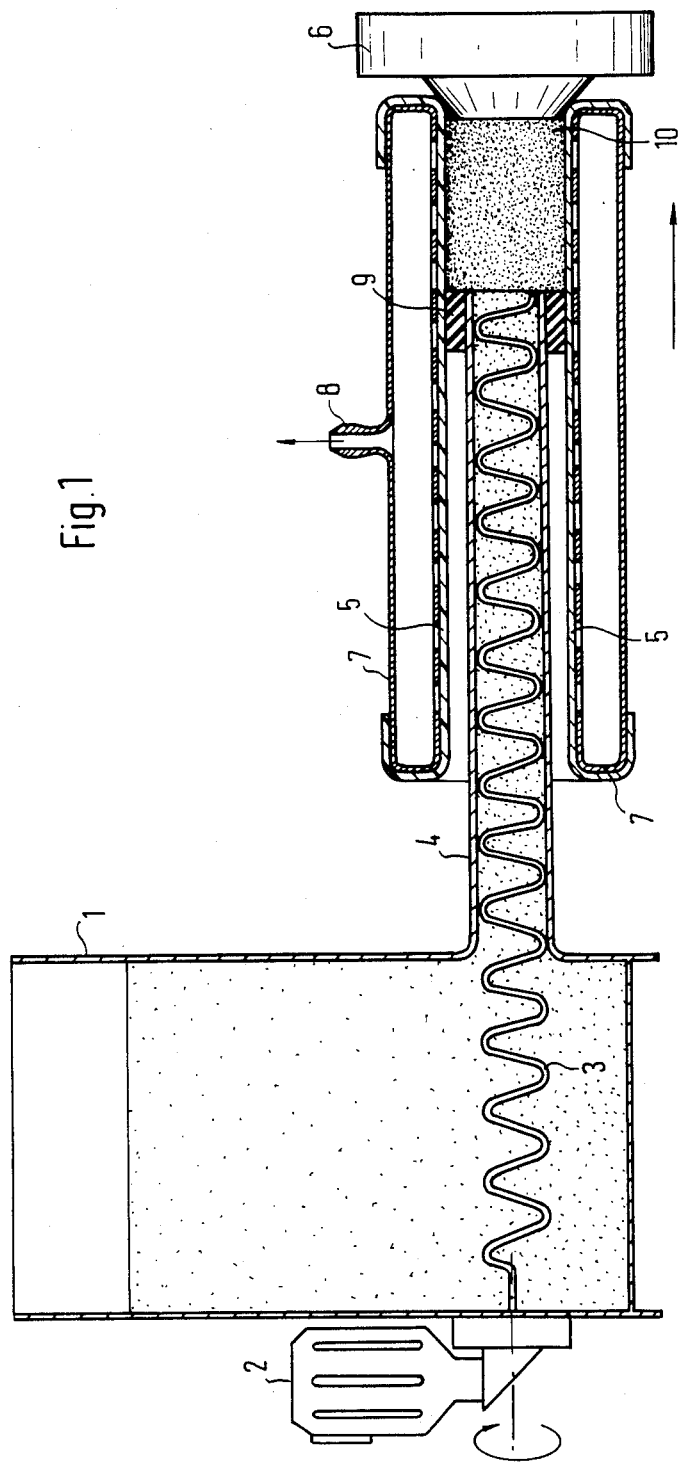
FIG. 1 is a partially sectional side elevational view of a device for filling the powdery starting material into a compression mold according to the process proposed by the invention.

The device as shown in FIG. 1 comprises a storage bin 1 containing the powdery glass starting material, with the interior of the bin 1 being sealed against the ambient atmosphere. In the aforementioned case of practical use of the invention, there is involved a synthetically manufactured powdery glass starting material on the basis of $SiO_2$, possibly with doping additions. For manufacturing the powder, it is contemplated to use not only the chemical vapor reaction processes as known from the aforementioned printed prior publication, and the flame hydrolysis process (also known as pyrogenic processes), but also the so-called "wet-chemical" processes, in which the powder material is obtained by precipitation from a chemical liquid-phase reaction and by subsequent drying of the precipitated material.

Depending on the moisture and purity state of the synthetically produced powder material, it may be necessary or advisable, prior to the filling into the storage bin 1, to carry out a drying operation by way of tempering in a vacuum and/or a purification operation by way of a heat treatment in a chlorine-containing atmosphere. The drying and purifying effect, owing to the large surface of the powder material, is more intensive than the corresponding treatment subsequent to the forming of the porous bodies. Accordingly, this pre-treatment permits the use of less pure and less dry starting materials which can be manufactured in a more cost-effective manner than drier and/or purer materials.

In order to increase the bulk density of the powder material and, consequently, to facilitate a shape-keeping compression, it may be necessary or advisable to agglomerate the powder material, for which purpose thermal or mechanical or liquid processes are available.

Inside the storage bin 1, near the bottom, there is arranged a screw conveyor 3 which is driven by an external motor 2, with the aid of which the powder material contained in the storage bin 1 can be conveyed through an elongated conveying tube 4 out of the storage bin 1. The conveying tube 4 projects into a compression mold which is to be filled with the powder material. In the given example, the compression mold is a flexible hose 5 which, at its end lying in the conveying direction, is closed by a cover 6. The fill-in pressure is produced in that the screw conveyor 3 passes the material by the conveying force produced by its motor 2 in direction toward the cover 6, and in that the cover 6 is acted upon by a counterforce in opposition to the conveying direction.

For restricting the feed pressure, there is provided a device which will be explained hereinafter with reference to FIG. 2, and which provides for the production of an adjustable counterforce. The flexible hose 5 if used by itself as the compression mold would, in all probability, be irregularly expanded by the effect of the fill-in pressure, and there would result considerable deviations from the desired cylindrical form of the filled-in material body. For this reason, the hose 5, during the fill-in process, is shape-stabilized by a rigid shape retaining body 7 surrounding it. Actually, a tube would be sufficient for this purpose, over which the ends of the hose 5 would be slipped, and to the inside wall of which the hose 5 would be applied during the fill-in process. However, since during the subsequent compression of the material being filled into the hose 5, there occurs a considerable shrinkage in volume, creases are caused in the hose 5 during this compression process, which are visible on the surface of the resultant porous body and thus lead to unwanted corrugations or a waviness at the surface thereof when no special countermeasures are taken. According to an advantageous feature of the process according to the invention, it is proposed as a countermeasure that the hose 5 be preexpanded during the fill-in process, thus preventing it from forming creases during the subsequent compression. This is effected in that, as a shape-stabilizing rigid body 7, there is used a double-walled tube whose inner wall is perforated as shown in the drawing, and whose inner space between the two walls is capable of being subjected to either an increased or a reduced pressure. To effect a pressure variation, an opening with a tubular joint (or socket) 8 is provided for in the outer wall of the tube 7, on which a conduit leading to a vacuum pump can be slid. The vacuum pump, such as a water-jet pump, produces in the interspace between the walls of the tube 7 a suction pressure which, through the perforated inner wall, acts upon the hose 5, pulls it in direction toward the inner wall and expands it to such an extent as to be smoothly applied to this inner wall. The thus constructed rigid shape retaining body 7, accordingly, simultaneously permits preexpansion of the hose 5 and a shape stabilization of the hose 5 during the fill-in process.

For sealing the interspace between the conveying tube 4 and the pre-expanded hose 5, the outlet end of the conveying tube 4 is surrounded by a sealing ring 9 which is attached to the conveying tube 4 and is operative for providing a constant frictional force between the conveying tube 4 and the pre-expanded hose 5, which force is not dependent on just how far the conveying tube 4 projects into the compression mold 5.

The end of the compression mold 5 lying in the conveying direction is sealed by the already mentioned cover 6 which, on its side facing the compression mold 5, is provided with a truncated cone-shaped extension 10 which is pushed to the end of the tube 7 that is covered by the hose 5, in such a manner that its jacketing surface is firmly applied to the tube end, thus sealing the latter. The cover 6 is attached to the tube 7 with the aid of holding means that is not shown, such as a clamp, which is capable of being mounted to the outside of the tube 7, or by a cap surrounding the cover 6 and capable of being screwed on to the outside of the tube 7.

When filling the powder material into the described compression mold 5, the material is pre-compacted by the action of the fill-in pressure. In the course of this operation, the conveying force of the screw conveyor 3 pushes the entire compression mold 5 inclusive of the shape retaining body 7 in opposition to the counterforce acting upon the cover 6, away from the conveying tube 4 in the conveying direction until, in this way, almost the entire interior space of the hose 5 is filled with the pre-compacted powder material. The motion of the compression mold 5 relative to the conveying tube 4 during the feed operation is indicated by an arrow shown below the compression mold 5, pointing in the conveying direction.

Following the fill-in operation, the vacuum pump is turned off and the air conduit is removed from the tube joint or socket 8. The pre-expanded hose 5, owing to the filled-in pre-compacted powder material, remains in its expanded state. The compression mold 5, inclusive of the shape retaining body 7 surrounding it, is now removed from the fill-in device which is shown in its entirety in FIG. 2 and is still to be explained hereinafter, and is inserted into the hydraulic fluid of an isostatic press after its other end has also been closed by a cover corresponding to the cover 6 described hereinbefore. The hydraulic fluid of the isostatic press enters through the tube joint or socket 8 into the interspace of the double-walled tube 7, with the air contained therein escaping either through this joint or socket 8 as well, or through a further opening which is additionally provided but has not been shown. Thereupon, the isostatic press subjects the hydraulic fluid to a pressure ranging between 100 and 300 bar, with this pressure acting through the perforated inner wall of the tube 7 upon the outer side of the pre-expanded hose 5 for pressing the latter together in the radial direction, so that the desired porous body will result. Although the isostatic press exerts a uniform pressure from all sides upon any structure contained in its hydraulic fluid, the pressure, in the present case, owing to the tube ends being closed by rigid covers 6, only acts in the radial direction upon the compression mold 5, so that durin9 the compression process the longitudinal dimension of the filled-in material remains unchanged.

Unlike the isostatic pressing referred to a as a preferred pressing process in the aforementioned German Pat. No. DE-PS 30 40 355, the exclusively radial pressing facilitates the fabrication of long, continuous porous bodies, because the parameters of the pressing process are not changed by a change in length.

Upon completion of the pressing operation, the tube 7 is removed from the isostatic press, one or both covers 6 are opened, and the compressed body surrounded by the hose 5, is removed from the tube 7. After this, the hose 5 is again expanded and the pressed porous body is removed therefrom. Prior to any further processing, it may become necessary to mechanically process the porous body on its surface until it shows to have the desired geometrical shape, for example, by way of grinding the surface.

The porous body is next subjected to a physical and/or chemical cleaning. As a physical cleaning there may be used cleaning in an electric arc or in a high-voltage plasma, and as a chemical cleaning there may be used heat treatment in a chlorine-containing atmosphere in order thus to remove from the porous body any possible impurities in the form of hydroxyl groups and transition metals.

The porous body which, owing to the described process, has a homogeneous material composition, can now be further processed into an optical waveguide, for example, in that it, by way of sintering, is transformed into a glass body, with the latter then being drawn out into a glass fiber.

In the simplest case, this fiber, during the drawing process, can be coated with a transparent plastic sheathing having a refractive index smaller than that of the glass material, so that an optical waveguide will result in the form of a plastics clad fiber, a so-called PCS (plastics clad silica) fiber. The porous body, however, may also be further processed in any other way into a different type of optical waveguide, as will still be explained hereinafter.

Figure 2:
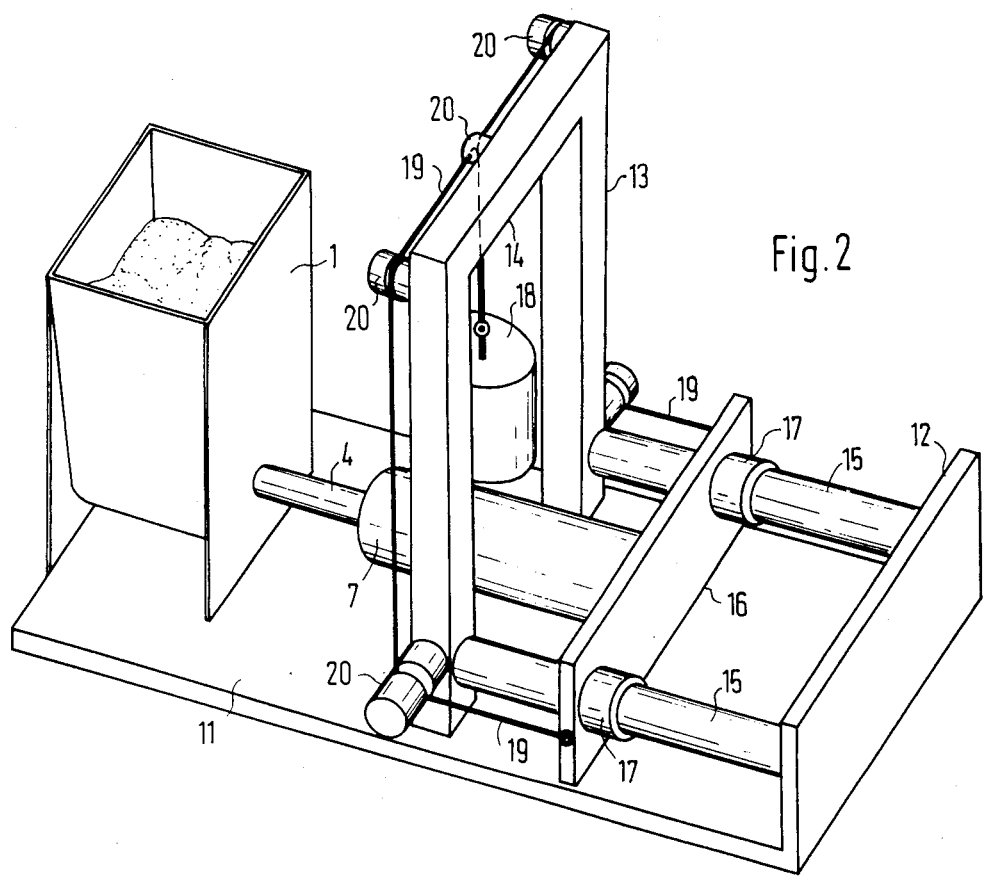
FIG. 2 is a perspective view of an arrangement for adjusting the fill-in pressure as used in conjunction with that device of the type shown in FIG. 1.

With reference to FIG. 2, there will now be explained the entire construction of a fill-in device of which details essential with respect to the process according to the invention have already been shown in FIG. 1, and in particular, the device which, during the fill-in operation, produces the counterforce acting in opposition to the conveying force of the screw conveyor 3. The following parts are firmly mounted on an elongated baseplate 11: the powder storage bin 1 with the conveying tube 4 projecting therefrom, a mounting plate 12 vertically placed on the baseplate 11, this plate 12 and the powder storage bin 1 being placed at respective opposite longitudinal ends of the baseplate 11, and a supporting frame 13 which is mounted in a bridge-like manner on the baseplate 11, that is, in such a way that its crosspiece 14 extends at right angles in relation to the longitudinal axis of the baseplate 11 and parallel in relation to the direction of the mounting plate 12. Between the vertical members of the supporting frame 13 and the mounting plate 12, there extend two parallel guide elements 15, such as guide tubes, on which a counterpressure plate 16 which is provided with guide sleeves 17 is mounted for displacement in the longitudinal direction of the baseplate 11, between the supporting frame 13 and the mounting plate 12.

The tube 7 which contains the compression mold 5 and into which the conveying tube 4 projects is displaceable in the longitudinal direction of the baseplate 11 just like the counterpressure plate 16, either on account of the fact that it is connected rigidly, but detachably, to the counterpressure plate 16, or in that it is displaceably supported in a guide groove of the baseplate 11 with its end that is closed by the cover 6 being applied to the counterpressure plate 16 without being connected thereto. This counterpressure plate 16 is applied from the outside to the end of the tube 7 by an adjustable weight 18 which is suspended on the supporting frame 13 via traction ropes 19 and rope pulleys 20, with the powder material inside the tube 7 being pushed against the end of the tube 7 by the action of the screw conveyor 3. The traction ropes 19 are mounted on both sides of the counterpressure plate 16.

In this way, during the fill-in operation and by the action of the screw conveyor 3, the compression mold 5 is pushed in the conveying direction away from the conveying tube 4, with the filled-in material thus being pre-compacted and with the pressure under which the pre-compaction is performed being determined by the weight 18 which presses the counter-pressure plate 16 and, consequently, the end of the conveying tube 4 in opposition to the force of the screw conveyor 3. The conveying speed at which the powder material is filled into the compression mold 5 is determined by the construction of the screw conveyor 3 and the number of revolutions per minute thereof, with the fill-in pressure being adjustable by the weight 18.

It is self-evident that a number of other devices is equally suitable for performing the filling of the powder into the compression mold 5 at an adjustable fill-in pressure. For example, a device operating kinematically in the reverse would also be possible, in which the tube 7 would be firmly mounted and the powder storage bin 1 together with the conveying tube 4 would have to be arranged displaceably in opposition to the conveying direction, in opposition to an adjustable weight acting in opposition to the conveying force.

In principle, the fill-in operation as described with reference to FIG. 1 can also be applied to such cases in which the porous body to be formed has no homogeneous composition, but a material composition changing in the radial direction. This is possible in that, in addition to the shown screw conveyor 3 by which powderized material is conveyed within the area of the longitudinal axis of the compression mold 5, one or more further screw conveyors are provided which are disposed coaxially in relation to the central screw conveyor 3, for filling materials with other compositions into coaxial areas surrounding the central area. These screw conveyors are then disposed in the interspaces between several coaxially disposed conveyor tubes. The conveying speed and the fill-in pressure can be individually adjusted with respect to each of the screw conveyors, and the maximum fill-in pressure effected within the respective area is determined, as already described hereinbefore, by the counterforce acting upon the closed end of the tube 7. By individually adjusting the fill-in pressure respectively effected by the various screw conveyors, it is possible to obtain selected axial variations in the diameter relations of the individual areas neighboring each other. By using such an arrangement of coaxial screw conveyors, the process according to the invention permits, with a view to the fabrication of various types of optical waveguides, the forming of porous bodies which are required to consist of core glass material and, if so required, with radially varying compositions, and a subsequently following cladding glass material in any desired gradation.

It is also possible to fabricate other porous bodies not having an exclusively rotation-symmetrical structure as the hitherto described ones, when using screw conveyors which are disposed, for example, in a triangle or a square, with conveyor tubes respectively surrounding them. In that way it would become possible to fabricate optical waveguides with multiple cores in which independent light signals are capable of propagating parallel next to each other, or which have polarization-maintaining properties. In cases where such an arrangement of cores is still required to be surrounded by one or more claddings, this can also be accomplished by using one or more further screw conveyors extending around this arrangement of cores, for filling one or more materials into areas lying coaxially in relation to the longitudinal axis of the multiple-core arrangement. Again, for each individual screw conveyor, both the fill-in pressure and the conveying speed can be adjusted individually.

In the foregoing part of the specification, the compression mold 5, independently of the arrangement of the screw conveyors, was always described as having the shape of a hollow cylinder, so that the subsequently following compression would in any case result in a rod-shaped porous body. The compression mold 5, however, may also be designed in such a way that the resulting formed porous body is of tubular shape. For this purpose there is used a screw conveyor which, unlike the screw conveyor 3 as shown in FIG. 1, does not convey the material within the area of its axis, but within an area having a circular ring-shaped cross section disposed coaxially in relation to its axis of rotation. One such screw conveyor is shown in FIG. 3a.

This type of screw conveyor 20 rotates in the interspace between an inner tube 21 and an outer tube 22 disposed coaxially in relation thereto, about the inner tube 21, so as to convey the powdery glass starting material through this interspace into the compression mold 3 and into an area coaxially distant from the axis.

Figure 3A:
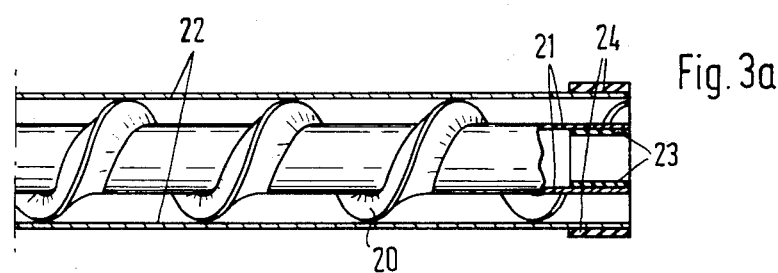
FIG. 3a is a longitudinal sectional view of a part of a conveying device for forming a tubular porous body.

As the compression mold 5 for forming a tubular body there may be used either the type of compression mold 5 as shown in FIG. 1, which would have to be slightly modified, or else a compression mold as shown in FIG. 3. The modification of the compression mold 5 as shown in FIG. 1 consists in that, along its longitudinal axis and extending from one to the other end thereof, there is disposed a rod or a tube, for example, of silica glass which can be mounted e.g. at the cover 6 in a central recess and, following the fill-in process, in a corresponding recess of the other cover. The screw conveyor of the type as shown in FIG. 3a now conveys the powdery material in a way corresponding to that described hereinbefore with reference to FIG. 1, into the interspace between this rod or tube and the pre-expanded hose 5. Following the compression process, the rod-shaped or tubular base body can be easily removed from the center of the compressed porous body.

At its front end, the arragement as shown in FIG. 3a comprises two sealing rings 23 and 24 for sealing the area within which the powdery material is conveyed into the compression mold and which, just like the sealing ring 9 in the arrangement as shown in FIG. 1, provide for a constant position-independent frictional force. The inner sealing ring 23 is mounted to the inside of the inner tube 21 and is applied to the outer side of the rod-shaped or tubular base body, whereas the outer sealing ring 24 is mounted to the outer side of the outer tube 22 and is applied to the inner side of the hose 5 in the case of the compression mold 5 as shown in FIG. 1.

Figure 3B:
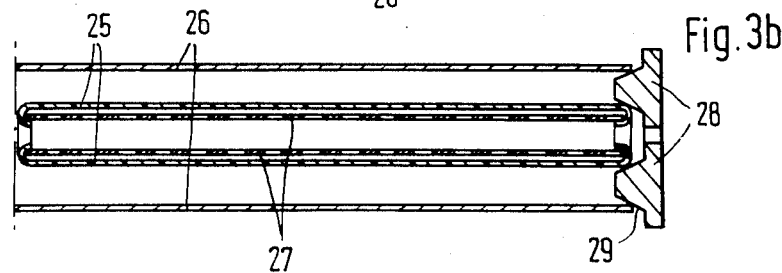

Another embodiment of a compression mold for forming a tubular porous body by employing a screw conveyor of the type shown in FIG. 3a is shown in FIG. 3b. This compression mold consists of a flexible hose 25 and of a rigid outer tube 26. The powder material is filled with the aid of the device as shown in FIG. 3a, into the interspace between the hose 25 and the outer tube 26. For shape-stabilizing the hose 25 during the fill-in operation, it is slipped onto a rigid base body 27. As such a base body 27 there is preferably used a perforated tube through the holes or apertures of which the hydraulic fluid of a press may exert its pressure upon the inside of the hose 25, so that the powder material that is filled between the hose and the rigid outer tube 26, and pre-compacted in the course of this operation, can be pressed in the radial direction against the outer wall of the tube 27. Unlike with the arrangement of FIG. 1, a pre-expansion of the hose 25 is not necessary in this arrangement because here the hose 25 is expanded during the compression operation from the inside toward the outside, and is not pressed as in the case of FIG. 1, from the outside toward the inside. During the fill-in operation, the interspace between the hose 25 applied to the perforated tube 25 and the rigid outer tube 26 is closed at the end of the compression mold 25 lying in the conveying direction, with the aid of a rigid cover 28 which has an annular bead 29 projecting into the interspace for sealing the latter at the edges. In order to permit the hydraulic fluid to enter from the inside into the perforated tube 27 subsequently to the fill-in operation, the cover 28 has a hole in its center, just like a corresponding cover applied to the other side of the compression mold 25. As with the arrangement shown in FIG. 1, following the fill-in operation, an adjustable counterforce is exerted upon the rear side of the cover 28, which restricts the fill-in pressure. Also with this type of compression mold 5, the pressing is effected in the radial direction for the same reasons as described in connection with FIG. 1, and also offers the same advantages in this case.

There are several ways of transforming the tubular porous body into a rod-shaped elongated glass body which is suitable for serving as a preform for an optical waveguide. Following a physical, chemical and, if so required, mechanical treatment corresponding to that described hereinbefore in connection with the rod-shaped porous body, the tubular porous body may be sintered in such a way that it, during the sintering, collapses into a rod-shaped glass body. A second possibility resides in that a rod-shaped porous body is inserted into the tubular porous body fabricated in the way described hereinbefore, and in that this porous rod-tube structure is sintered to obtain the rod-shaped glass body. In cases where the tubular body consists of the cladding material of an optical waveguide, and the rod-shaped body of the core material thereof, an optical waveguide having a core-cladding structure can be produced from the thus fabricated vitreous preform.

Another possibility of forming an elongated glass body from a rod-shaped porous body and a tubular porous body resides in that the tubular porous body is sintered into a glass tube, and the rod-shaped porous body is separately sintered into a glass rod, with the glass rod then being inserted into the glass tube and this structure being fused to obtain an elongated glass body.

It should still be mentioned that in every phase of the described process, from the stage of fabricating the powdery starting material to the sintering into an elongated glass body suitable for use as a preform, care must be taken for preventing the material from becoming contaminated.

For this purpose, it is preferable for the storage bins containing the powder material to be always airtightly sealed, and for the feeding of the material into the compression mold to be carried out in a sealed atmosphere, for example, in an evacuated glove box. Into this glove box, the one conveyor tube or a plurality of such conveyor tubes projects from the outside through a vacuum-sealed passage. The compression mold is removed from this glove box only after it has been closed on both sides with a cover, and is then placed into the isostatic press.

A further measure for avoiding contaminations resides in that the heat treatment of the porous body is carried out in a chlorine-gas atmosphere, with the subsequent sintering into a glass body being carried out in an apparatus which is constructed to keep the porous body, during the heat treatment in the chlorine-gas atmosphere, for example, in that the porous body is moved from a low elevation toward a higher elevation through a first zone in which the heat treatment is carried out, and from there immediately into a second zone in which the sintering is carried out.

In the following description, there will still be described an alternative version of a process which likewise employs the principle according to the invention, of pre-compacting the powdery glass starting material during the filling into the compression mold, but in which for the filling into the compression mold, there are not used any screw conveyors. This variant form of the process resides in that the compression mold, which may be designed in the same way or similar to the compression molds described hereinbefore, is caused to rotate during the fill-in operation, in such a way that the centrifugal force becomes effective in the direction of its longitudinal axis, with the powder material being filled-in and pre-compacted under the effect of such centrifugal force, with the fill-in pressure being determined by the centrifugal force. In this process, too, several coaxial tubes may be used for fabricating a porous body having a radially gradated composition, or else a tubular porous body.

While we have described above the principles of our invention in connection with specific apparatus, it is to be clearly understood that this description is made only by way of example and not as a limitation to the scope of our invention as set forth in the objects thereof and in the accompanying claims.

We claim:

1. A method of making a glass preform, the method comprising:
    providing an elongated, hollow mold member having a flexible sidewall, one open end and a closed end opposite thereto;
    applying a longitudinal force against the closure at said closed end so that the force acts upon the closure and upon the mold member in the direction of the open end;
    then filling said mold member by forcing glass forming pulverulent material into said open end so that the increase in mass of material resulting from said filling causes said pulverulent material to act against said closed end in opposition to said longitudinal force and thereby moves said mold member against said longitudinal force;
    discontinuing the filling step and closing the open end of said mold member; and
    forming a glass preform by comprising said material in said mold member to form a porous body and sintering to form said glass preform.

2. A method in accordance with claim 1 wherein said forming step includes applying substantially uniform compressive force against the outer surface of said sidewall to compress said pulverulent material and form a porous body thereof, and removing said mold member from said porous body and sintering said porous body to form a glass preform.

3. A method in accordance with claim 2 wherein the sidewall of said mold member is expanded outwardly before said filling step and is retained in its expanded condition during said filling step.

4. A method in accordance with claim 3 wherein said mold is expanded by applying a vacuum to the outer surface of said sidewall.

5. A method in accordance with claim 2 wherein only the sidewall of said mold member is compressed during the compressing step.

6. A method in accordance with claim 2 wherein said filling step includes utilizing feeding means for forcing the pulverulent material into said mold member and wherein said feeding means is initially located adjacent the closed end of said mold member so that the movement of said mold member provides more volume for filling.

7. The process as defined in claim 2, wherein said filling step includes utilizing a screw conveyor to advance the pulverulent starting material into the mold member, and controlling the pressure and advancement speed of the pulverulent starting material during its advancement by the screw conveyor.

8. The process as defined in claim 2, wherein said filling step includes utilizing a plurality of screw conveyors coaxially surrounding one another each to advance a pulverulent starting material of a different composition into the mold member, and controlling the pressure and advancement speeds of the pulverulent starting materials during their advancement by the respective screw conveyors.

9. The process as defined in claim 2, wherein said filling step includes utilizing a plurality of screw conveyors arranged in parallel next to one another to advance pulverulent starting materials of predetermined compositions into a central region of the mold member and at least one additional screw conveyor arranged around the plurality of screw conveyors to advance at least one pulverulent starting material of a composition different from the predetermined compositions into a region of the confining zone that surrounds the central region, and controlling the pressure and advancement speeds of the pulverulent starting materials during their advancement by the respective screw conveyors.

10. The process as defined in claim 2, wherein said filling step includes utilizing a mold which is so configurated that the porous body is rod-shaped.

11. The process as defined in claim 2, wherein said filling step includes utilizing a mold which is so configurated that the porous body is tubular.

12. The process as defined in claim 1, and further comprising the step of cleaning the porous body.

13. The process as defined in claim 12, and further comprising the step of mechanically shaping the porous body prior to said cleaning step.

14. The process as defined in claim 2, wherein said filling step includes separately producing a rod-shaped porous body and a tubular porous body; further comprising the step of assembling said rod-shaped and tubular porous bodies with one another into a composite assembly; and wherein said sintering step includes sintering the composite assembly into a composite glass body.

15. The process as defined in claim 2, wherein said filling step includes separately producing a rod-shaped porous body and a tubular porous body; wherein said sintering step includes separately sintering the rod-shaped and tubular porous bodies into respective rod-shaped and tubular glass bodies; and further comprising the steps of assembling the rod-shaped and tubular glass bodies with one another into a composite glass assembly, and fusing such glass bodies of the glass assembly into a single composite glass body.

16. The process as defined in claim 2, wherein said filling step includes using a synthetically produced pulverulent material for the starting material; and further comprising the step of drying the synthetically produced pulverulent material prior to said filling step.

17. The process as defined in claim 2, wherein said filling step includes using a synthetically produced pulverulent material for the starting material; and further comprising the step of heat-treating the synthetically produced pulverulent material in a chlorine-containing atmosphere prior to said filling step.

18. The process as defined in claim 2, further comprising the step of agglomerating the pulverulent starting material to increase its bulk density prior to said filling step.

* * * * *